(12) United States Patent
Sezginer et al.

(10) Patent No.: US 8,503,556 B2
(45) Date of Patent: Aug. 6, 2013

(54) CHANNEL ESTIMATION METHOD

(75) Inventors: Serdar Sezginer, Boulogne Billancourt (FR); Yang Liu, Paris (FR)

(73) Assignee: Sequans Communications, Puteaux (FR)

( * ) Notice: Subject to any disclaimer, the term of this patent is extended or adjusted under 35 U.S.C. 154(b) by 110 days.

(21) Appl. No.: 13/273,942

(22) Filed: Oct. 14, 2011

(65) Prior Publication Data

US 2012/0093246 A1 Apr. 19, 2012

(30) Foreign Application Priority Data

Oct. 15, 2010 (EP) .................................... 10187691

(51) Int. Cl.
*H04L 27/06* (2006.01)
(52) U.S. Cl.
USPC ........................................... 375/260
(58) Field of Classification Search
USPC .................. 375/260, 340, 341, 346
See application file for complete search history.

(56) References Cited

U.S. PATENT DOCUMENTS

| | | | |
|---|---|---|---|
| 6,768,713 B1 * | 7/2004 | Siala et al. | 370/203 |
| 2009/0103666 A1 * | 4/2009 | Zhao et al. | 375/341 |
| 2012/0307945 A1 * | 12/2012 | Koo et al. | 375/340 |
| 2012/0321025 A1 * | 12/2012 | Sezginer et al. | 375/346 |

OTHER PUBLICATIONS

Seyed Mohammad Sajad Sadough, "Robust Interative Receiver Design Under Imperfect Channel Estimation" IEEE 6th Conference on Wireless Advanced, Jun. 27, 2010.
Aldana C. H. et al., "Channel Tracking for Multiple Input, Single Output Systems Using EM Alogrithm" IEEE International Conference on Communications, Jun. 11, 2001.
Mehmet Kemal Ozdemir et al., "Channel Estimation for Wireless OFDM Systems" IEEE Communications Surveys, Apr. 1, 2007.
Berrou et al., "Near Shannon Limit Error-Correcting Coding and Decoding: Turbo-Codes" IEEE 1993.
Boher et al., "Performance Analysis of Interative Receiver in 3GPP/ LTE DL MIMO OFDMA System" IEEE Aug. 2008.
3GPP, "Evolved Universal Terrestrial Radio Access (E-UTRA); Physical Channels and Modulation" Mar. 2008.
Dempster et al., "Maximum Likelihood from Incomplete Data via the EM Alogrithm," Journal of Royal Statistical Society. Series B (Methodological). vol. 39, No. 1 (1977), pp. 1-38.

(Continued)

*Primary Examiner* — Jaison Joseph
(74) *Attorney, Agent, or Firm* — David D. Brush; Westman, Champlin & Kelly, P.A.

(57) ABSTRACT

A channel estimating method is provided for a signal transmitted in an orthogonal frequency division multiplexing (OFDM) system, wherein an OFDM symbol of the signal has at least one null subcarrier set in its defined bandwidth. The method includes: obtaining at least one initial channel estimate over at least one OFDM symbol of a received signal; processing the at least one initial channel estimate for delivering at least one soft information in a form of a complete matrix; and updating the at least one initial channel estimate by performing a truncated singular value decomposition of a partial FFT matrix. The partial FFT matrix includes only the first $L_{DP}$ columns and the rows $N_{DP}$ of an FFT matrix of the complete matrix, the $N_{DP}$ rows corresponding to modulated subcarriers of received signal, including data and pilot symbols and excluding the at least one null subcarrier, delivering an improved channel estimate.

7 Claims, 1 Drawing Sheet

OTHER PUBLICATIONS

Ma et al., "EM-Based Channel Estimation Algorithms for OFDM" EURASIP Journal on Applied Signal Processing vol. 2004, No. 10, pp. 1460-1477.

Liu et al., "EM Channel Estimation for Coded OFDM Transmissions over Frequency-Selective Channel" in Proc. IEEE 10th International Symposium on Spread Spectrum Techniques and Applications, 2008 (ISSSTA'08), Aug. 2008.

Xie et al., "Two-EM-Type Channel Estimation Algorithms for OFDM with Transmitter Diversity," IEEE Trans, Commun., vol. 51, No. 1, pp. 106-115, Jan. 2003.

Diallo et al., "Transform Domain Channel Estimation with Null Subcarriers for MIMO-OFDM Systems," in Proc. IEEE ISWCS'08, Oct. 2008.

Van De Beek et al., "On Channel Estimation in OFDM Systems," in Proc. 45th IEEE Vehicular Technology Conference, 1995 (VTC'1995), vol. 2, Sep. 1995, pp. 815-819.

European Search Report and Written Opinion dated Jan. 5, 2011 for corresponding European Application No. 10 187 691.0, filed Oct. 15, 2010.

* cited by examiner

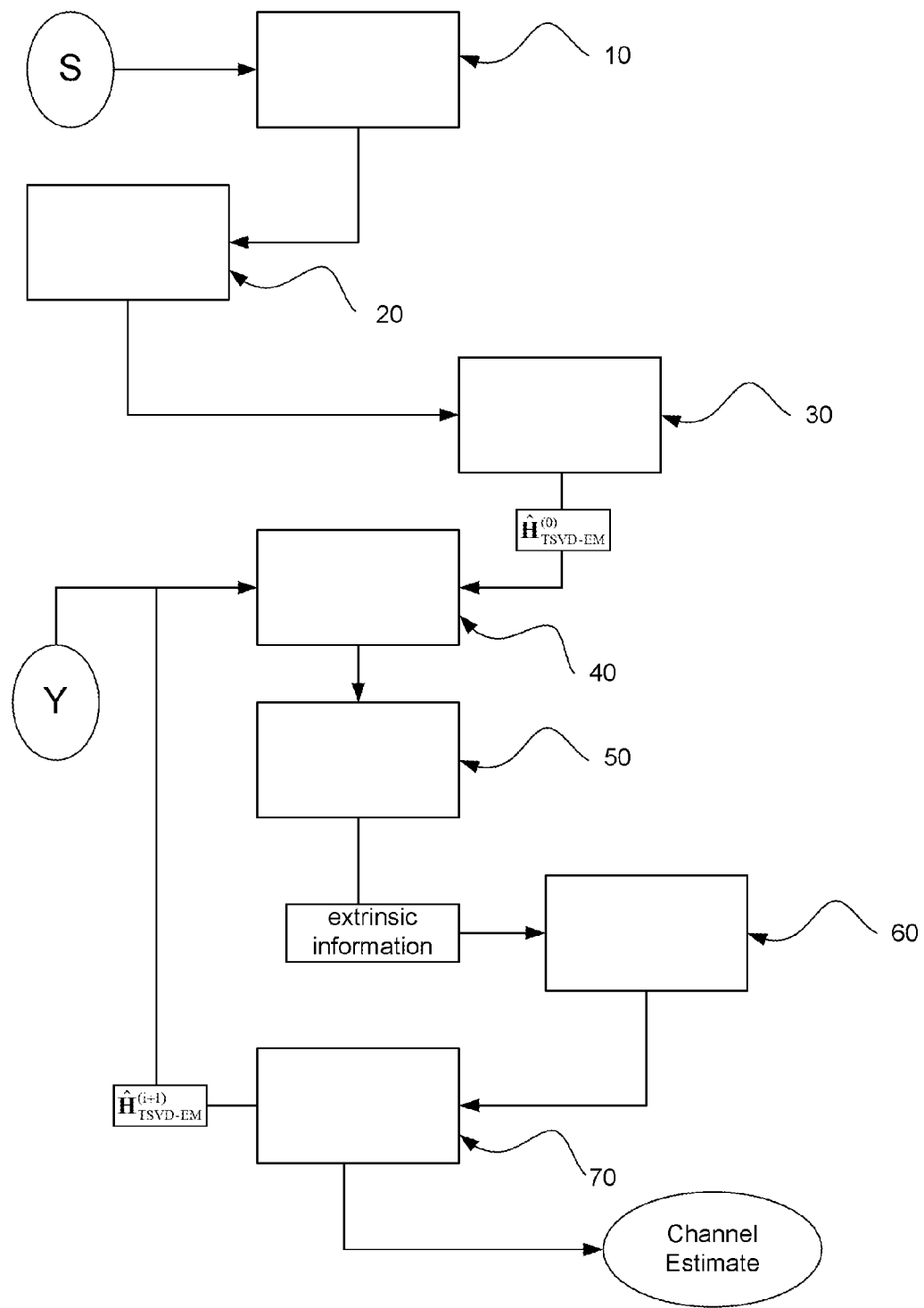

CHANNEL ESTIMATION METHOD

CROSS-REFERENCE TO RELATED APPLICATIONS

None.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The disclosure relates to data reception techniques and transmission techniques.

More particularly, the disclosure relates to channel estimation techniques in OFDM transmission systems. Such systems comprise some base station and some mobile station. More particularly, the disclosure relates to a method and to a device for estimating a received signal in a wireless receiver.

BACKGROUND OF THE DISCLOSURE

In recent years, with the appearance of "turbo principle", iterative receivers are becoming more and more popular and promising because of their excellent performances. Different mechanisms have been proposed and studied, for example, iterative detection, iterative multi-input multi-output (MIMO) equalization, etc.

However, these iterative mechanisms are seriously affected by channel estimator. For example, it has been shown that an iterative MIMO equalizer is more sensitive to channel estimation, and the traditional non-iterative channel estimators cannot provide sufficiently accurate channel estimates.

This necessitates more accurate channel estimates in order to improve system performances. Recently, iterative channel estimation is being considered to improve the accuracy of channel estimation, which uses the "soft" information of data to improve channel estimation performance. This type of channel estimation algorithms is particularly helpful for systems which have fewer and/or lower powered pilot symbols. For example, in Long Term Evolution (LTE) systems, at most two (2) OFDM symbols carry pilots in a given resource block and this decreases to one (1) OFDM symbol for MIMO transmission. A resource block (RB) is the minimum allocation unit over seven (7) OFDM symbols and twelve (12) subcarriers.

With this sparse pilot arrangement, the iterative channel estimation can be a good candidate to improve channel estimates. Moreover, for future standards, one of the key features is to build more power efficient transmission systems and, in this manner, decreasing the power of pilots is one of the possible ways to improve the power consumption efficiency. In such systems, the channel estimation algorithms used in current systems will have less accuracy and more robust algorithms will be needed.

Some iterative channel estimators have already been proposed for orthogonal frequency-division multiplexing (OFDM) systems by using the extrinsic information from decoder. Among these iterative algorithms, the expectation maximization (EM) based channel estimation is taking attention because of its attractive performance. The EM algorithm is an iterative method to find the maximum-likelihood (ML) estimates of parameters in the presence of unobserved data. The idea behind the algorithm is to augment the observed data with latent data, which can be either missing data or parameter values, so that the likelihood function conditioned on the data and the latent data has a form that is easy to manipulate.

In others words, instead of computing the maximum-likelihood (ML) channel estimate from the observations only, the EM algorithm makes use of the so-called complete data $\kappa$, which are not observed directly but only through incomplete data.

The EM algorithm performs a two-step procedure: the "E-step" and the "M-step". In the case of an estimation of a channel, these two steps have the following form:

1) E-step: compute the auxiliary function:

$$Q(h|\hat{h}^{(i)}) = E_\kappa[\log p(\kappa|h)|Y, \hat{h}^{(i)}]; \qquad (1)$$

2) M-step: update the parameters:

$$\hat{h}^{(i+1)} = \arg\max_h Q(h|\hat{h}^{(i)}), \qquad (2)$$

where h stands for the parameters to be estimated; $\hat{h}^{(i)}$ represents the estimated parameters in the $i^{th}$ iteration; Y stands for the observed data and $\kappa$ is the so-called "complete data", which contains observed data and some missed data. Likelihood increases along EM iterations.

In previous works, the EM channel estimation has been proposed for uncoded and coded OFDM systems with the assumption that pilots exist in every OFDM symbol. However, in practical specifications such as 3GPP LTE, IEEE 802.16m and LTE-Advanced, pilot symbols are present on certain OFDM symbols only.

Furthermore, even though the EM channel estimation method provides good performances and convergence property, it has a non negligible complexity because of a matrix inversion. When it is fully performed in one LTE sub-frame, the complexity of channel estimation and the latency are raised.

In a practical system like LTE, the traditional EM channel estimation method has another problem: it always considers the whole bandwidth, which is not the case in practical systems. Furthermore, in a practical system, "null" (guard) subcarriers are inserted at both sides of the bandwidth.

These "null" subcarriers make the traditional EM algorithm diverge, which is a substantial problem and leads to an inefficiency of the method.

Thus, it is important to propose an EM algorithm for practical systems and to make it converge even in the presence of "null" subcarriers. There is furthermore a need for proposing an EM channel estimation method in which the complexity of the calculation is reduced in order to shorten latency time.

SUMMARY

An aspect of the disclosure relates to a channel estimating method of a signal transmitted in an orthogonal frequency division multiplexing (OFDM) system, wherein an OFDM symbol of said signal has at least one null subcarrier set in its defined bandwidth.

According to an aspect of the disclosure, the method comprises the following steps:

obtaining at least one initial channel estimate $\hat{H}^{(0)}$ over at least one OFDM symbol of a received signal;

processing said at least one initial channel estimate $\hat{H}^{(0)}$ for delivering at least one soft information in a form of a complete matrix;

updating said at least one initial channel estimate $\hat{H}^{(0)}$ by performing a truncated singular value decomposition of a partial FFT matrix $\Omega_{L_{DP}}$, wherein said partial FFT matrix comprises only the first $L_{DP}$ columns and the rows $N_{DP}$ of an FFT matrix of said complete matrix, said $N_{DP}$ rows corresponding to modulated subcarriers of received signal, including data and pilot symbols and excluding said at least one null subcarrier, delivering an improved channel estimate $\hat{H}_{TSVP-EM}^{(i)}$.

Thus an aspect of the disclosure allows improving the channel estimating and reducing the calculations for obtaining said channel estimation. Indeed, the truncated singular value decomposition of the partial FFT matrix eases the calculation and eliminates the need to proceed to a matrix inversion.

According to a specific embodiment, said method comprises at least one iteration of the following step:

updating said at least one previously improved channel estimate $\hat{H}_{TSVP-EM}^{(i)}$ by performing a truncated singular value decomposition of a partial FFT matrix $\Omega_{L_{DP}}$, wherein said partial FFT matrix comprises only the first $L_{DP}$ columns and the $N_{DP}$ rows of an FFT matrix of a complete matrix, said $N_{DP}$ rows corresponding to modulated subcarriers of received signal, including data and pilot symbols and excluding said at least one null subcarrier, said improving delivering at least one improved channel estimate $\hat{H}_{TSVP-EM}^{(i+1)}$.

According to an aspect of the disclosure, said improving step comprises:

decomposing said partial FFT Matrix $\Omega_{L_{DP}}$ as $\Omega_{L_{DP}} = U\Sigma V^H$, where the matrix U is an $N_{DP} \times N_{DP}$ unitary matrix, $\Sigma$ is an $N_{DP} \times L_{DP}$ diagonal matrix with non negative real numbers on the diagonal, and V is an $L_{DP} \times L_{DP}$ unitary matrix;

applying a threshold value T for at least one singular value of said matrix $\Sigma$, wherein a current singular value of said matrix $\Sigma$ is kept unchanged when said current singular value is greater than said threshold and a current singular of said matrix $\Sigma$ value is set to 0 when said current singular value is lower or equal to said threshold;

deriving resulting truncated matrices $U_S$, $\Sigma_S$ and $V_S$ which contain the S left (remaining) columns of matrices U, $\Sigma$ and V respectively;

calculating channel estimates by applying said matrices $U_S$, $\Sigma_S$ and $V_S$ in an expectation maximization algorithm.

Thus, unlike traditional methods, the use of a truncated matrix ensures that all the singular values of the matrix to be inverted are greater than a threshold and consequently, that the matrix itself, in the case of this application, becomes invertible.

According to a specific embodiment, said step of calculating channel estimates by applying said matrices $U_S$, $\Sigma_S$ and $V_S$ in an expectation maximization algorithm corresponds to the calculation of $\hat{H}_{TSVP-EM}^{(i+1)}$ as:

$$\hat{H}_{TSVP-EM}^{(i+1)} = \Omega_{L_{DP}} V_S (\Sigma_S^T)^{-1} U_S^H (R_{N_{DP} \times N_{DP}}^{(i)})^{-1} \text{diag}(\tilde{X}^{(i)*}) Y,$$

where $(\cdot)^H$ stands for transpose-conjugate and $(\cdot)^*$ stands for complex conjugate, Y stands for a received signal vector, $\tilde{X}^{(i)}$ represents a soft symbol vector which contain a posteriori probabilities (APPs) of a data vector X at the $i^{th}$ iteration and $$R_{N_{DP} \times N_{DP}}^{(i)} = \sum_X APP_i(X) \text{diag}(X^{(i)*}) \text{diag}(X^{(i)}).$$

According to an embodiment, said step for obtaining at least one initial channel estimate comprises:

receiving said multicarrier signal.

extracting information from at least one reference symbol, called pilots, from said received signal;

generating an initial estimation based on said reference symbols over the OFDM symbols of said multicarrier signal which comprises pilots.

Another embodiment relates to a channel estimating apparatus of a signal transmitted in an orthogonal frequency division multiplexing (OFDM) system, wherein an OFDM symbol of said signal has at least one null subcarrier set in its defined bandwidth, According to an aspect of the disclosure said channel estimating apparatus comprises means for:

obtaining at least one initial channel estimate $\hat{H}^{(0)}$ over at least one OFDM symbol of a received signal;

processing said at least one initial channel estimate $\hat{H}^{(0)}$ for delivering at least one soft information in a form of a complete matrix;

updating said at least one initial channel estimate $\hat{H}^{(0)}$ by performing a truncated singular value decomposition of a partial FFT matrix $\Omega_{L_{DP}}$, wherein said partial FFT matrix comprises only the first $L_{DP}$ columns and the rows $N_{DP}$ of an FFT matrix of said complete matrix, said $N_{DP}$ rows corresponding to modulated subcarriers of received signal, including data and pilot symbols and excluding said at least one null subcarrier, delivering an improved channel estimate $\hat{H}_{TSVP-EM}^{(i)}$.

Another embodiment relates to a detector used in conjunction with a channel estimating apparatus as previously described, said detector providing likelihoods and log likelihoods rations in function of soft values obtained from an equalizer and being based on a mean square error estimation. According to an aspect of the disclosure, said detector is characterized in that a constant channel estimation mean square error value is employed in said detector:

$$P(X_i = S_m) \propto \exp\left\{-\frac{|Y_i - \mu_i S_m|^2}{\sigma_{EQU}^2 + \sigma_{CHE}^2}\right\},$$

where $\mu_i$ and $\sigma_{EQU}^2$, represent mean value and variance obtained from said equalizer and $\sigma_{EQU}^2$ is the constant mean square error value $MSE_{TSVD-EM}$ in:

$$MSE_{TSVD-EM} \approx E\left\{\sum_{i=0}^{L-1} |h_i|^2 (1 - A_{ii})\right\}$$

where $A_{ii}$ represents the $i^{th}$ diagonal entry of an L×L matrix $V_S V_S^H$ and $h_i$ is the $i^{th}$ tap in an estimated channel; $E\{\cdot\}$ stands for the expectation and L is the delay spread of channel, $V_S$ being a result of a truncated singular value decomposition of $\Omega_{L_{DP}}$.

An embodiment also relates to a computer program product downloadable from a communications network and/or stored in a computer-readable carrier and/or executable by a microprocessor. According to an embodiment, such a program comprises program code instructions for the implementation of the steps of the channel estimation method as previously described in various embodiments.

BRIEF DESCRIPTION OF THE DRAWINGS

The proposed method is described in the following by way of examples in connection with the accompanying FIGURE without limiting the scope of the protection as defined by the claim, in which FIG. 1 is a flowchart of an exemplary embodiment of the channel estimating method.

DETAILED DESCRIPTION OF ILLUSTRATIVE EMBODIMENTS AND RELATED HARDWARE

1. General Principles of an Exemplary Aspect of the Disclosure

The base idea of an aspect of the disclosure is to make the EM channel estimation method more usable in practical specifications. Thus, in order to make the EM channel estimation method more practical, some simplified EM channel estimation method may be considered by keeping almost the same performance.

Such a simplified EM channel estimation method, as proposed by the inventors, ensures that the "null" subcarriers which are inserted at both sides of the bandwidth of an OFDM symbol will not lead to a divergence of the EM channel estimation method. This simplified EM channel estimation method also ensures that the complexity of channel estimation is reduced.

For realizing this simplification, the inventors propose a method for arbitrary eliminating the matrix inversion of the traditional EM channel estimation method. Such an elimination leads to a reduction of the number of calculation made and consequently to shorten latency time.

One possible method for lowering the complexity of the calculation is to introduce, in the estimation method, a threshold, which is used to decide whether a singular value of a given matrix should be considered as null or not. This method will be described herein after.

In the following description a so-called truncated singular value decomposition EM (TSVD-EM) channel estimation algorithm working with a novel detector is proposed.

This method integrates the truncated SVD and EM algorithm to deal with "null" subcarriers.

One further analyzes the mean square error (MSE) property of the proposed algorithm. Based on the MSE analysis, a new detector is proposed. This detector works together with the proposed iterative channel estimation algorithm and guarantees system performances converge at high signal-to-noise ration (SNR). Herein after, it is referred to LTE systems as an example. However, it is worth mentioning that the principles of the disclosure can be generalized to any OFDMA-based communication system, for example.

In other words, an aspect of the disclosure proposes an EM based channel estimation algorithm (in LTE systems), where some "null" subcarriers exist and special pilot arrangement is considered with limited pilot symbols.

In a general implementation, described in relation with FIG. 1, the teachings of the current disclosure can be included in a global channel estimation method which comprises the following steps:
  a. Receiving the multicarrier signal (10).
  b. Extracting the information (20) from the reference symbols (pilots).
  c. Generating an initial estimation (30) based on these reference symbols over the OFDM symbols which have pilots.
  d. Implement time domain interpolation (40) to obtain all channel estimates over all OFDM symbols.
  e. With initial channel estimates, implement equalization, detection and decoding (50). In detector, the proposed novel detector is used (see below).
  f. Obtain soft information (60) from decoder and perform TSVD-EM (70) over the OFDM symbols which have pilots to improve the performance of channel estimation.
  g. Perform the whole iterations (from 40 to 70) to further improve the performance of channel estimation until the results converge.

In other words, the principle of an aspect of the disclosure is to use the properties of the EM algorithm for channel estimation without having the drawbacks of the non convergence of the algorithm in standard conditions. These drawbacks are eliminated by truncating the singular value decomposition which is made during the estimation of the channel with the conventional EM algorithm. By truncating, an aspect of the disclosure means eliminating some rows of the matrices which results from the decomposition for facilitating the calculations. This elimination of some rows of the matrices is done in function of a threshold value (named T) which facilitates the process of deciding whether a current singular value of the singular matrix has to be placed to 0 or not.

In this disclosure, the terms "soft information" means some "probabilities".

An aspect of the disclosure has the following advantages:
  with the proposed TSVD-EM algorithm, the convergence of the EM algorithm is guaranteed with "null" subcarriers in practical systems, such as LTE;
  the proposed TSVD-EM has a lower complexity, because, as it will be showed, the matrix inversion, in each iteration of the conventional EM, is not needed anymore;
  the associated proposed novel detector always converges even with high SNR.

2. Description of a Particular Embodiment
2.1 TSVD-EM Algorithm

As already told, it is known that EM based algorithms provide excellent performances in OFDM systems. However, they always consider all subcarriers to implement iterative channel estimation.

The estimation procedure for EM based channel estimation can be formulized as:

$$\hat{H}_{EM}^{(i+1)} = \Omega_L(\Omega_L^H R_{N\times N}^{(i)} \Omega_L)^{-1} \Omega_L^H \text{diag}(\tilde{X}^{(i)*}) Y \qquad (3)$$

where $(\bullet)^H$ stands for transpose-conjugate and $(\bullet)^*$ stands for complex conjugate, Y stands for the received signal vector, $\Omega_L$ is a matrix of the first L (L representing the delay spread of channel, only the first L columns of the FFT matrix are needed because, there is only L taps in the time domain.) columns of the Fast Fourier Transform (FFT) matrix $\Omega$ whose $mn^{th}$ $(m,n=1,2,\ldots,N)$ element is given by $$[\Omega]_{m,n} = \frac{1}{\sqrt{N}} e^{\frac{j2\pi(m-1)(n-1)}{N}},$$

$\tilde{X}^{(i)}$ represents soft symbol vector which contain the a posteriori probabilities (APPs) of the data vector X at the $i^{th}$ iteration, $\hat{H}_{EM}^{(i+1)}$ is the estimated channel vector at the $(i+1)^{th}$ iteration, and $$R_{N \times N}^{(i)} = \sum_X APP_i(X) \text{diag}(X^{(i)*}) \text{diag}(X^{(i)}) \quad (4)$$

$R_{N \times N}^{(i)}$ contains the soft information of the previous $(i)^{th}$, obtained from the decoder.

In equation (3), all subcarriers are considered in the EM channel estimation. One can have small condition numbers, defined by the ratio between the greatest and the smallest singular values ("the maximum-to-minimum-singular-value ratio", MMSVR), which make the EM channel estimation perform well.

However, in practical systems, some "null" subcarriers always exist as a "guard band" and equation (3) thus becomes:

$$\hat{H}_{EM}^{(i+1)} = \Omega_{L_{DP}} (\Omega_{L_{DP}}^H R_{N_{DP} \times N_{DP}}^{(i)} \Omega_{L_{DP}})^{-1} \Omega_{L_{DP}}^H \text{diag}(\tilde{X}^{(i)*}) Y \quad (5)$$

where $N_{DP}$ represents the number of modulated subcarriers and $\Omega_{L_{DP}}$ contains only the rows of $\Omega_L$ corresponding to the modulated subcarriers, including data and pilot symbols.

With these "null" subcarriers (and the resulting equation (5)), the matrix invertibility in traditional EM algorithm cannot be guaranteed anymore. Consequently, the EM algorithm will not converge, because the matrix can not be inverted. This problem arises from the "condition number" of the new partial FFT matrix $\Omega_{L_{DP}}$.

For the record, a matrix A is told to be invertible if AB=I for some matrix B and BA=I for the same matrix B. The condition number of a matrix $\Omega$ is the ratio between the maximum singular value and the minimum singular value. For determining the maximum singular value and the minimum singular value, a singular value decomposition of the matrix $\Omega$ is needed. Suppose $\Omega$ is an m×n matrix. Then there exists a factorization, called a singular-value decomposition, of the form $\Omega = U\Sigma V^H$, where U is an m×m unitary matrix, the matrix $\Sigma$ is an m×n diagonal matrix with nonnegative real numbers on the diagonal, and $V^H$, an n×n unitary matrix, denotes the conjugate transpose of V. Such a factorization is called the singular-value decomposition of $\Omega$ and the singular values correspond to the diagonal values of the matrix $\Sigma$, in which the maximum singular value and the minimum singular value can be found.

The inventors have note that to make the EM algorithm converge with "null" subcarriers, the matrix to be inverted should have a good condition number, which is not possible as such. In order to solve this problem, the inventors propose to use a "truncated singular value decomposition" (TSVD) in the EM algorithm (namely, TSVD-EM) instead of the conventional singular-value decomposition. It works as follows:

1. Decompose the partial FFT matrix $\Omega_{L_{DP}}$.

$$\Omega_{L_{DP}} = U\Sigma V^H \quad (6)$$

where the matrix U is an $N_{DP} \times N_{DP}$ unitary matrix, the matrix $\Sigma$ is $N_{DP} \times L_{DP}$ diagonal matrix with non negative real numbers on the diagonal which are arranged, and V denotes an $L_{DP} \times L_{DP}$ unitary matrix.

2. Set a threshold T for all L singular values obtained from the decomposition and only keep the singular values which are greater than the threshold. The values which are lower than the threshold T are rejected and only S values are left in the new matrix. This new matrix has fewer columns than the original one. After this truncation, the SVD decomposition can be approximated as:

$$\Omega_{L_{DP}} \approx U_S \Sigma_S V_S^H \quad (7)$$

where $U_S$, $\Sigma_S$ and $V_S$ are truncated matrices which contain the left S columns of matrices U, $\Sigma$ and V respectively, and S is the number of left singular values after the threshold.

3. Use matrices $U_S$, $\Sigma_S$ and $V_S$ in the EM algorithm.

Based on these steps, the TSVD-EM can be expressed as:

$$\hat{H}_{TSVD-EM}^{(i+1)} = \Omega_{L_{DP}} V_S (\Sigma_S^T)^{-1} U_S^H (R_{N_{DP} \times N_{DP}}^{(i)})^{-1} \text{diag}(\tilde{X}^{(i)*}) Y \quad (8)$$

where $\Sigma_S$ and $R_{N_{DP} \times N_{DP}}^{(i)}$ are diagonal matrices.

According to an aspect of the disclosure, the equation (8) is obtained through the traditional EM with SVD. In the traditional EM, the FFT matrix can be decomposed as:

$$\Omega_L = U\Sigma V^H.$$

With this decomposition, the matrix inverse of the traditional EM in equation (3) can be written as $$(\Omega_L^H R_{N \times N}^{(i)} \Omega_L)^{-1} = (V\Sigma^H U^H R_{N \times N}^{(i)} U\Sigma V^H)^{-1} = V\Sigma^{-1} U^H R_{N \times N}^{(i)-1} U(\Sigma^T)^{-1} V^H.$$

Substituting it into equation (3), leads to:

$$\hat{H}_{TSVP-EM}^{(i+1)} = \Omega_L V\Sigma^{-1} U^H (R_{N \times N}^{(i)})^{-1} U(\Sigma^T)^{-1} V^H \cdot V\Sigma^H U^H \text{diag}(\tilde{X}^{(i)*}) Y.$$

Considering the auto-correlated columns of U and V, we have $U^H U = I$ and $V^H V = I$. Then, the traditional EM can be written as $$\hat{H}_{TSVP-EM}^{(i+1)} = \Omega_L V(\Sigma^T)^{-1} U^H (R_{N \times N}^{(i)})^{-1} \text{diag}(\tilde{X}^{(i)*}) Y.$$

For TSVD-EM, after the truncation, the partial FFT matrix can be approximated as $$\Omega_{L_{DP}} \approx U_S \Sigma_S V_S^H.$$

According to an aspect of the disclosure, using the result of SVD-EM, the previous approximation is directly used and leads to the equation (8) which is part of the subject matter conceived by the inventors of the present application.

The iterative procedure should be terminated as soon as the difference between $\hat{H}_{TSVD-EM}^{(i+1)}$ and $\hat{H}_{TSVD-EM}^{(i)}$ is sufficiently small, since at this point, $\hat{H}_{TSVD-EM}^{(i)}$ has presumably converged to the estimate one is seeking.

2.2 Complexity Calculation

With traditional EM in OFDM systems, one always has $R_{N \times N}^{(i)}$ in the matrix inversion.

Since the matrix $R_{N \times N}^{(i)}$ contains soft information from decoder, it has to be calculated in each iteration and so does the matrix inversion. The complexity of this matrix inversion is $O(L^3)$ After matrix inversion, in order to get all channel estimates, the computations are $O(N^2)$. Thus, the complexity is $O(L^3) + O(N^2)$. For a channel with long delay spread, which is the case in practical channel models, this complexity is very high.

According to an aspect of the disclosure, since in equation (8), $\Sigma_S$ and $R_{N_{DP} \times N_{DP}}^{(i)}$ are diagonal matrices, no matrix inversion is needed. With TSVD-EM, the matrix computation $\Omega_{L_{DP}} V_S (\Sigma_S^T)^{-1} U_S^H$ can be done offline once the threshold T of singular values is set. In each iteration, we only need to calculate soft information on symbols and multiply with the pre-calculated matrix. Thus, the complexity for TSVD-EM is $O(N_{DP}^2)$. Therefore, with TSVD-EM, the complexity is reduced by $O(L^3)$. For typical LTE channel models, the value of L is large and this complexity reduction is important for practical systems.

3. Initial Channel Estimate and Time Interpolation

As it is well-known, initial channel estimates are important for the EM channel estimation algorithm. For TSVD-EM, different algorithms can be used to obtain initial channel estimates $\hat{H}_{TSVD-EM}^{(0)}$ for example, the simple least square (LS) algorithm. Furthermore, in practical systems, pilots (reference symbols) exist only in certain OFDM symbols according to a special arrangement.

In order to obtain all channel estimates with a low complexity in practical systems, the TSVD-EM may be performed only over the OFDM symbols where reference symbols exist. Then, based on the channel estimates from TSVD-EM, an interpolation in time domain can be performed to obtain channel estimates over the other OFDM symbols where reference symbols do not exist.

4. Detector Jointly Working with TSVD-EM Estimator

From theoretical analysis, the mean square error (MSE) of the TSVD-EM is a constant value at high signal to noise ratio (SNR), $$MSE_{TSVD-EM} \approx E\left\{\sum_{i=0}^{L-1} |h_i|^2 (1 - A_{ii})\right\} \quad (9)$$

where $A_{ii}$ represents the $i^{th}$ diagonal entry of the L×L matrix $V_S V_S^H$ and $h_i$ is the $i^{th}$ tap in channel; $E\{\bullet\}$ stands for the expectation and L is the delay spread of channel. From equation (9), it can be seen that the MSE of the TSVD-EM only depends on the power profile of channel and the threshold T of TSVD.

In iterative receiver, channel estimates (the initial one or the ones of the previous iteration) are iteratively fed to equalizer to generate soft values of transmitted symbols. After equalizer, the soft values are sent to detector to generate likelihoods, which will be used to calculate the a posteriori probabilities (APP), and log likelihood ration (LLR) values, which will be sent to channel decoder. More precisely, detector determines, for each bit of the transmitted transmit vector, a measure for the probability (the so-called log-likelihood ratio) that the transmitted bit was a "1" (or "0"), or does so for a collection of bits. The soft decision values provided by the soft decision detector can be quantized to reduce the result to hard decisions, or some other processing can be done to collectively reduce the result to hard decisions, such as using a trellis decoder.

Since traditional detectors only consider variance from equalizer, the constant MSE value of TSVE-EM can impact detection performance and the convergence of the algorithm considerably. Especially at high SNR, this constant MSE will make system performances diverge.

In order to improve detection performance, the inventors propose to consider this constant MSE value directly in detector:

$$P(X_i = S_m) \propto \exp\left\{-\frac{|Y_i - \mu_i S_m|^2}{\sigma_{EQU}^2 + \sigma_{CHE}^2}\right\} \quad (10)$$

where $\mu_i$ and $\sigma_{EQU}^2$ represent mean value and variance from equalizer and $\sigma_{CHE}^2$ is the constant MSE in equation (10) from TSVD-EM channel estimator.

Thus, the inventors propose a TSVD-EM based channel estimation algorithm in OFDM systems (for example LTE systems) where some "null" subcarriers exist and special pilot arrangement is considered with limited number of pilot symbols. By considering the constant MSE of the proposed channel estimator at high SNR, a novel detector is also proposed to work with the TSVD-EM estimator. The proposed channel estimator has much lower complexity compared to traditional EM channel estimator and shows good convergence behavior even with "null" subcarriers.

Although the present disclosure has been described with reference to one or more examples, workers skilled in the art will recognize that changes may be made in form and detail without departing from the scope of the disclosure and/or the appended claims.

The invention claimed is:

1. A channel estimating method in an orthogonal frequency division multiplexing, OFDM, system transmitting a signal over a channel, said signal comprising a plurality of symbols, wherein each of said symbols comprises at least one null subcarrier, wherein the method comprises the following steps:

obtaining by a receiver device at least one initial channel estimate $\hat{H}^{(0)}$ over at least one OFDM symbol of said signal;

calculating by said receiver device at least one soft information, from said at least one initial channel estimate $\hat{H}^{(0)}$, delivering a N×N soft information matrix, N being the number of subcarriers of said at least one symbol; and updating said at least one initial channel estimate $\hat{H}^{(0)}$ by performing a truncated singular value decomposition of a partial FFT matrix $\Omega_{L_{DP}}$, wherein said partial FFT matrix comprises only the first $L_{DP}$ columns and the rows $N_{DP}$ of an FFT matrix of said N×N soft information matrix, said $N_{DP}$ rows corresponding to modulated subcarriers of said received signal, including data and pilot symbols and excluding said at least one null subcarrier, delivering an improved channel estimate $\hat{H}_{TSVD-EM}^{(i)}$, said updating step comprising:

decomposing said partial FFT Matrix $\Omega_{L_{DP}}$ as $\Omega_{L_{DP}} = U\Sigma V^H$, where the matrix U is an $N_{DP} \times N_{DP}$ unitary matrix, $\Sigma$ is an $N_{DP} \times L_{DP}$ diagonal matrix with non negative real numbers on the diagonal, and V is an $L_{DP} \times L_{DP}$ unitary matrix;

applying a threshold value T for at least one singular value of said matrix $\Sigma$, wherein one singular value of said matrix $\Sigma$ is kept unchanged when greater than said threshold T and is set to null when lower than said threshold T;

deriving resulting truncated matrices $U_s$, $\Sigma_s$ and $V_s$ which contain the S remaining columns of matrices U, $\Sigma$ and V respectively; and calculating channel estimates by applying said matrices $U_s$, $\Sigma_s$ and $V_s$ in an expectation maximization algorithm.

2. The method according to claim 1, wherein the method comprises at least one iteration of the following step:

updating said at least one previously improved channel estimate $\hat{H}_{TSVD-EM}^{(i)}$ by performing a truncated singular value decomposition of a partial FFT matrix $\Omega_{L_{DP}}$, wherein said partial FFT matrix comprises only the first $L_{DP}$ columns and the $N_{DP}$ rows of an FFT matrix of a N×N soft information matrix, said $N_{DP}$ rows corresponding to modulated subcarriers of received signal, including data and pilot symbols and excluding said at least one null subcarrier, said improving delivering at least one improved channel estimate $\hat{H}_{TSVD-EM}^{(i+1)}$, said updating step comprising:

decomposing said partial FFT Matrix $\Omega_{L_{DP}}$ as $\Omega_{L_{DP}} = U\Sigma V^H$, where the matrix U is an $N_{DP} \times N_{DP}$ unitary matrix, $\Sigma$ is an $N_{DP} \times L_{DP}$ diagonal matrix with non negative real numbers on the diagonal, and V is an $L_{DP} \times L_{DP}$ unitary matrix;

applying a threshold value T for at least one singular value of said matrix $\Sigma$, wherein one singular value of said matrix $\Sigma$ is kept unchanged when greater than said threshold T and is set to null when lower than said threshold T;

deriving resulting truncated matrices $U_s$, $\Sigma_s$ and $V_s$ which contain the S remaining columns of matrices U, $\Sigma$ and V respectively; and calculating channel estimates by applying said matrices $U_s$, $\Sigma_s$ and $V_s$ in an expectation maximization algorithm.

3. The method according to claim 1, wherein said step of calculating channel estimates by applying said matrices $U_s$, $\Sigma_s$ and $V_s$ in an expectation maximization algorithm corresponds to the calculation of $\hat{H}_{TVSD-EM}^{(i+1)}$ as:

$$\hat{H}_{TVSD-EM}^{(i+1)} = \Omega_{L_{DP}} V_S (\Sigma_S^T)^{-1} U_S^H (R_{N_{DP} \times N_{DP}}^{(i)})^{-1} \text{diag}(\hat{X}^{(i)*}) Y,$$

where $(\bullet)^H$ stands for transpose-conjugate and $(\bullet)^*$ stands for complex conjugate, Y stands for a received signal vector, $\hat{X}^{(i)}$ represents a soft symbol vector which contain a posteriori probabilities (APPs) of a data vector X at the $i^{th}$ iteration and $$R_{N_{DP} \times N_{DP}}^{(i)} = \sum_X APP_i(X) \text{diag}(X^{(i)*}) \text{diag}(X^{(i)}).$$

4. The method according to claim 1, wherein said step of obtaining at least one initial channel estimate comprises:

receiving said multicarrier signal;

extracting information from at least one reference symbol, called pilots, from said received signal; and generating an initial estimation based on said reference symbols over the OFDM symbols of said multicarrier signal which comprises pilots.

5. A channel estimating apparatus in an orthogonal frequency division multiplexing, OFDM, system transmitting a signal over a channel, said signal comprising a plurality of symbols, wherein each of said symbols comprises at least one null subcarrier, wherein the apparatus comprises:

means for obtaining at least one initial channel estimate $\hat{H}^{(0)}$ over at least one OFDM symbol of said signal;

means for calculating at least one soft information, from said at least one initial channel estimate $\hat{H}^{(0)}$, delivering a N×N soft information matrix, N being the number of subcarriers of said at least one symbol; and means for updating said at least one initial channel estimate $\hat{H}^{(0)}$ by performing a truncated singular value decomposition of a partial FFT matrix $\Omega_{L_{DP}}$, wherein said partial FFT matrix comprises only the first $L_{DP}$ columns and the rows $N_{DP}$ of an FFT matrix of said N×N soft information matrix, said $N_{DP}$ rows corresponding to modulated subcarriers of said received signal, including data and pilot symbols and excluding said at least one null subcarrier, delivering an improved channel estimate $\hat{H}_{TVSD-EM}^{(i)}$, said updating means comprising:

means for decomposing said partial FFT Matrix $\Omega_{L_{DP}}$ as $\Omega_{L_{DP}} = U\Sigma V^H$, where the matrix U is an $N_{DP} \times N_{DP}$ unitary matrix, $\Sigma$ is an $N_{DP} \times L_{DP}$ diagonal matrix with non negative real numbers on the diagonal, and V is an $L_{DP} \times L_{DP}$ unitary matrix;

means for applying a threshold value T for at least one singular value of said matrix $\Sigma$, wherein one singular value of said matrix $\Sigma$ is kept unchanged when greater than said threshold T and is set to null when lower than said threshold T;

means for deriving resulting truncated matrices $U_S$, $\Sigma_S$ and $V_S$ which contain the S remaining columns of matrices U, $\Sigma$ and V respectively; and means for calculating channel estimates by applying said matrices $U_S$, $\Sigma_S$ and $V_S$ in an expectation maximization algorithm.

6. A detector used in conjunction with the channel estimating apparatus as claimed in claim 5, said detector being configured to provide likelihoods and log likelihoods rations in function of soft values obtained from an equalizer and being based on a mean square error estimation, wherein the detector employs a constant channel estimation mean square error value in said detector:

$$P(X_i = S_m) \propto \exp\left\{-\frac{|Y_i - \mu_i S_m|^2}{\sigma_{EQU}^2 + \sigma_{CHE}^2}\right\},$$

where $\mu_i$ and $\sigma_{EQU}^2$ represent mean value and variance obtained from said equalizer and $\sigma_{CHE}^2$ is the constant mean square error value MSE $_{TSVD-EM}$ in:

$$MSE_{TSVD-EM} \approx E\left\{\sum_{i=0}^{L-1} |h_i|^2 (1 - A_{ii})\right\}$$

where $A_{ii}$, represents the $i^{th}$ diagonal entry of an L×L matrix $V_S V_S^H$ and $h_i$ is the $i^{th}$ tap in an estimated channel; $E\{\bullet\}$ stands for the expectation and L is the delay spread of channel, $V_S$ being a result of a truncated singular value decomposition of $\Omega_{L_{DP}}$.

7. A computer program product or stored on a non-transitory computer readable medium and executable by a microprocessor, wherein the product includes instructions of program code for implementing a channel estimating method in an orthogonal frequency division multiplexing, OFDM, system when the instructions are run on a computer, wherein the system transmits a signal over a channel, said signal comprising a plurality of symbols, wherein each of said symbols comprises at least one null subcarrier, and wherein the method comprises the following steps:

obtaining by a receiver device at least one initial channel estimate $\hat{H}^{(0)}$ over at least one OFDM symbol of said signal;

calculating by said receiver device at least one soft information, from said at least one initial channel estimate $\hat{H}^{(0)}$, delivering a N×N soft information matrix, N being the number of subcarriers of said at least one symbol; and updating said at least one initial channel estimate $\hat{H}^{(0)}$ by performing a truncated singular value decomposition of a partial FFT matrix $\Omega_{L_{DP}}$, wherein said partial FFT matrix comprises only the first $L_{DP}$ columns and the rows $N_{DP}$ of an FFT matrix of said N×N soft information matrix, said $N_{DP}$ rows corresponding to modulated subcarriers of said received signal, including data and pilot symbols and excluding said at least one null subcarrier, delivering an improved channel estimate $\hat{H}_{TVSD-EM}^{(i)}$ said updating step comprising:

decomposing said partial FFT Matrix $\Omega_{L_{DP}}$ as $\Omega_{L_{DP}} = U\Sigma V^H$, where the matrix. U is an $N_{DP} \times N_{DP}$ unitary matrix, $\Sigma$ is an $N_{DP} \times L_{DP}$ diagonal matrix with non negative real numbers on the diagonal, and V is an $L_{DP} \times L_{DP}$ unitary matrix;

applying a threshold value T for at least one singular value of said matrix $\Sigma$, wherein one singular value of said matrix $\Sigma$ is kept unchanged when greater than said threshold T and is set to null when lower than said threshold T:

deriving resulting truncated matrices $U_S$, $\Sigma_S$ and $V_S$ which contain the S remaining columns of matrices U, $\Sigma$ and V respectively: and calculating channel estimates by applying said matrices $U_S$, $\Sigma_S$ and $V_S$ in an expectation maximization algorithm.

* * * * *